Dec. 20, 1955 G. E. MARKLEY ET AL 2,727,306
BUTTER CUTTING AND DISPENSING APPARATUS
Filed Jan. 14, 1953 2 Sheets-Sheet 1

INVENTORS
GEORGE E. MARKLEY
BY LEROY L. GUSTAFSON
Hudson, Boughton,
Williams, David & Hoffmann
ATTORNEYS Dec. 20, 1955   G. E. MARKLEY ET AL   2,727,306
BUTTER CUTTING AND DISPENSING APPARATUS
Filed Jan. 14, 1953   2 Sheets-Sheet 2

INVENTORS
GEORGE E. MARKLEY
LEROY L. GUSTAFSON
BY Hudson, Boughton,
Williams, David & Hoffmann.
ATTORNEYS

United States Patent Office 2,727,306
Patented Dec. 20, 1955

2,727,306

BUTTER CUTTING AND DISPENSING APPARATUS

George E. Markley, Cleveland Heights, and Leroy L. Gustafson, Shaker Heights, Ohio Application January 14, 1953, Serial No. 331,226

11 Claims. (Cl. 31—21)

This invention relates to an apparatus for cutting and dispensing butter and butter substitutes and, more particularly, pertains to an apparatus for forming slices or pats of butter or butter substitutes from elongated blocks or bars thereof.

It is now customary to serve butter and butter substitutes in the form of small chips, slices, or pats. This requires that the elongated blocks or cubes of the butter material be cut transverse of their lengths a plurality of times. However, because of the consistency of butter materials and their tendency to adhere to metal, this is a difficult operation to perform neatly and quickly. The problem is especially acute where it is necessary to maintain the material in cold condition and yet repeatedly, and sanitarily, cut and dispense the material as needed. Although mechanisms have been devised heretofore for the purpose of expediting this cutting and dispensing of butter or the like in the form of chips or pats, these devices have generally proved unsatisfactory for a number of different reasons. For example, the conventional devices frequently prove incapable of repeatedly neatly severing the chips or pats without deformation thereof and many devices have no means for clearing the severed chips or pats from the cutting instrumentality when they cling thereto so that manual dislodging is necessary.

The principal object of this invention is to provide an improved apparatus for cutting an elongated block or cube of butter or like material into a plurality of individual chips or pats of uniform dimensions, the mechanism being easy and simple to operate and acting to sever the said chips or pats without appreciable deformation thereof and without undue sticking or binding of the severing means in passage through the block or cube of material.

Another object of the invention is to provide an improved apparatus for cutting butter or the like into individual slices or pats wherein the severing is effected by a pair of blade members movable towards and from each other from opposite sides of the block or cube of the material to be divided so that the cross-sectional configuration of the material is not appreciably altered and the drag upon the blades by engagement with the block or cube of severed material is reduced.

A further object of the invention is to provide an apparatus of the type defined above and further characterized by a provision of a means for clearing a severed slice or pat of butter or the like from the severing blades, said clearing means being operated by the handle or lever employed to operate the blades.

A still further object of the invention is to provide an improved apparatus for cutting and dispensing butter or the like as defined above in which the severing blades are moved to and from engagement in timed relation to the movement of stop members spaced therefrom and movable in and out of the path so that the block of butter material to be divided is alternately supported by the stop members and engaged by the blade members, the said members being operated by manipulation of a single handle member.

A more specific object of the invention is to provide an improved apparatus for cutting and dispensing butter material as defined in the preceding paragraphs and wherein the handle member is reciprocable in a straight line for effecting gauging and cutting of the chips or pats of butter, a means also being provided to permit the handle member to effect rocking movement transversely of its path of reciprocation when the blade members are in engagement to thereby permit the handle member to effect actuation of the slice clearing or detaching means.

The invention further resides in certain novel features of the construction, and in the combination and parts, of an apparatus in which the invention is embodied; and further objects and advantages will be apparent to those skilled in the art to which the invention pertains from the following description of the presently preferred embodiment illustrated in the accompanying drawings, forming a part of this application, and in which.

Figures 1, 2:
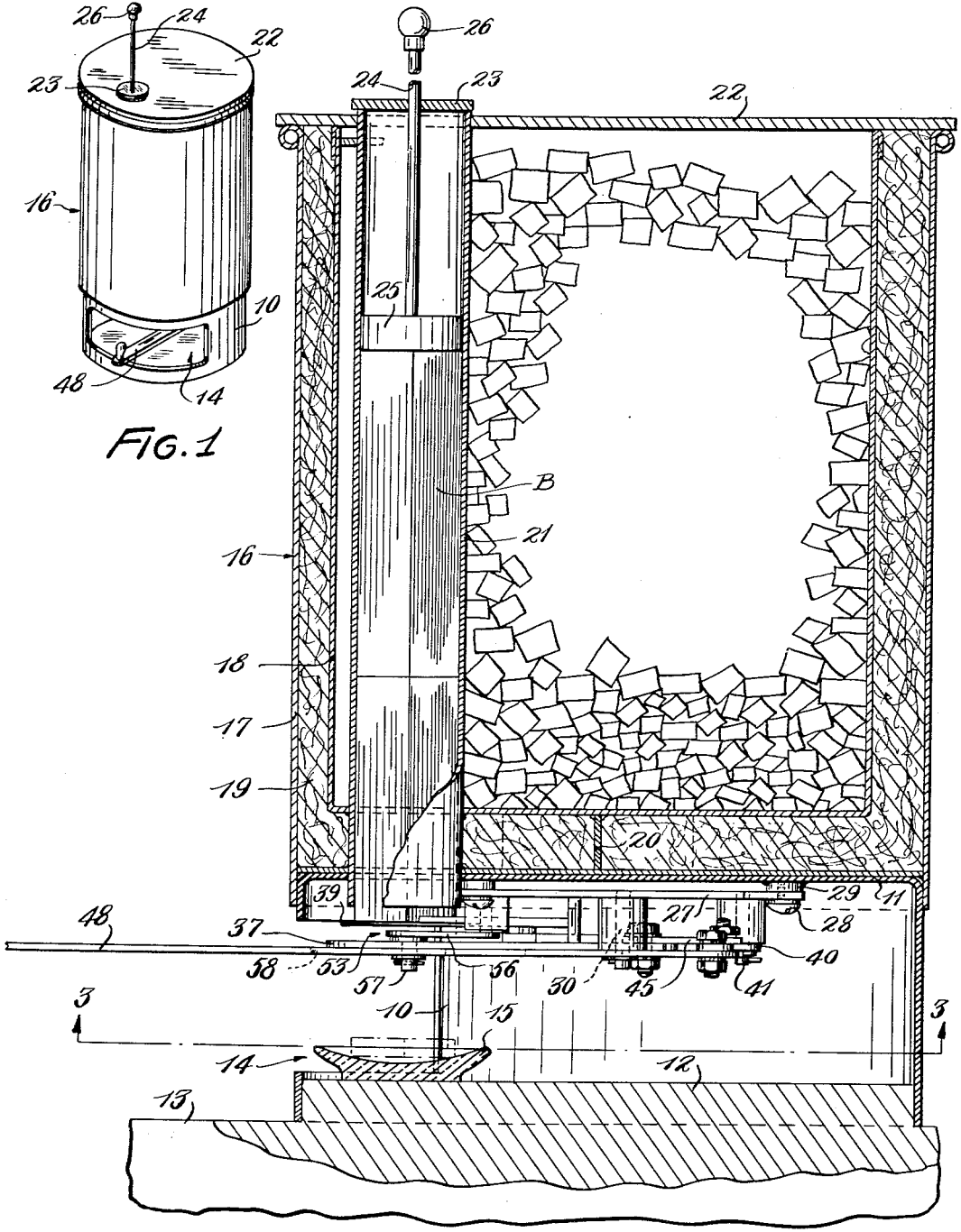
Fig. 1 is a perspective view to a reduced scale of a butter cutting and dispensing apparatus embodying the invention.
Fig. 2 is an enlarged view, principally in vertical sectional view through the apparatus shown in Fig. 1, but with the operating mechanism shown in side elevation.
Figure 3:
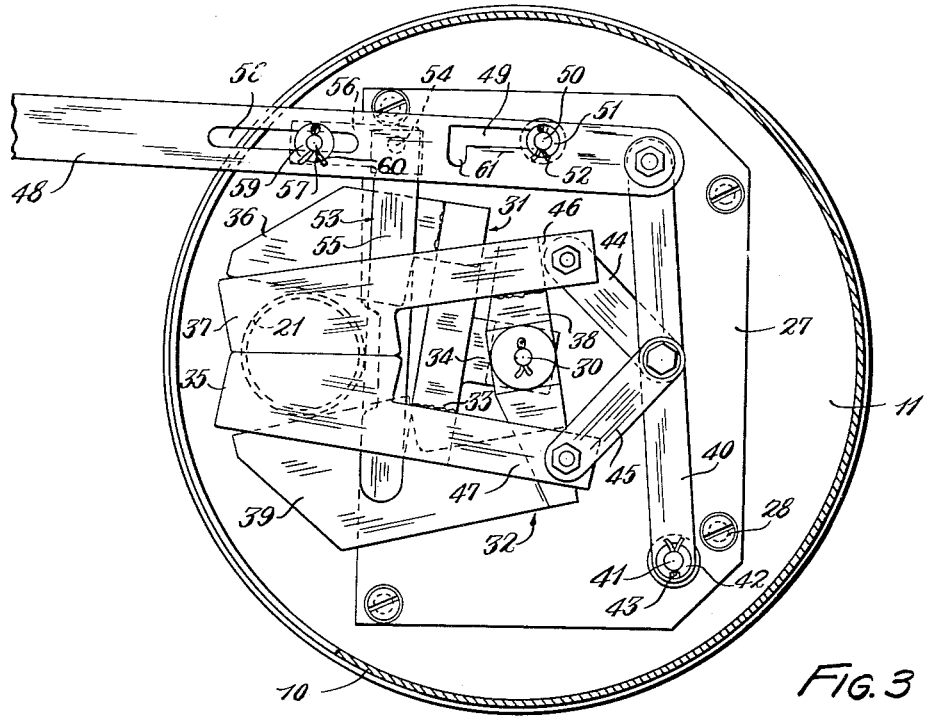
Figure 4:
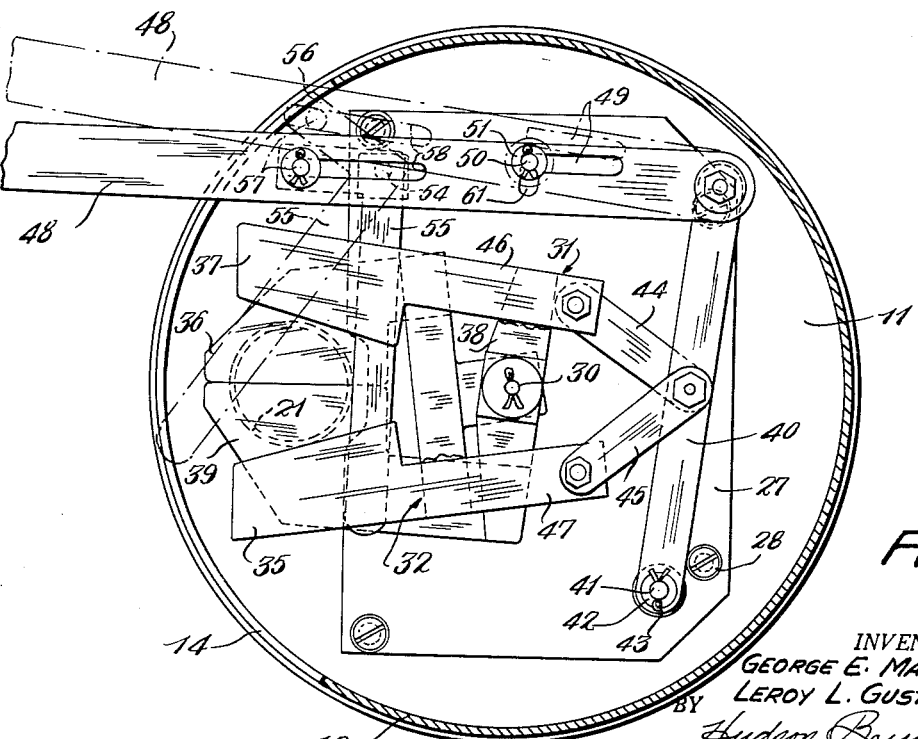

Fig. 3 is a view, principally in an elevation, of the mechanism as seen from beneath, the view being taken substantially along the line 3—3 of Fig. 2 and showing the cutting blades separated and the stop members in engagement; and Fig. 4 is a view similar to Fig. 3 but illustrating the parts of the apparatus as disposed after a slice or pat has been severed, the operated position of the slice or pat clearing means and corresponding position of the handle being indicated by broken lines.

The apparatus here illustrated as the presently preferred embodiment of the invention comprises a lower or supporting member 10 having a substantially horizontal upper portion 11 spaced above the table, counter or the like on which the apparatus rests. As here shown, the member 10 is substantially cylindrical and fits over a raised disc or portion on the counter or table 13 to retain the apparatus in fixed position thereon. The side wall of the supporting member 10 is provided with an arcuate opening 14 for the reception of a dish or the like 15 on which the chip or pat of butter, or other material, severed from the cube or block thereof is to be received. If desired, the disc or portion 12 may have a recess in the upper surface or other expedient, not shown, to facilitate location of the dish 15 so that it may be easily aligned beneath the chip or pat as it is cut.

The supporting member 10 is provided with an upwardly extending housing or compartment 16 which is preferably formed of spaced double walls 17 and 18 with insulating material 19 therebetween. The walls 17 and 18 are connected together and held in proper spaced relationship by suitable webs or the like, such as 20, as will be well understood by those skilled in the art. Secured within the chamber or compartment 16 and extending vertically therethrough is a tubular guide or supporting means 21 for receiving the elongated cubes or blocks of butter or butter substitutes, which are to be cut and dispensed. The tubular guide 21 is preferably circular in cross section and extends through aligned openings in the bottom of the compartment 16 and the horizontal portion or surface 11 of the supporting member 10. The lower end of the tube 21 extends slightly beneath the lower side of the horizontal surface or portion 11 and this together with downwardly extending portions of the outer walls 17 provides a means for properly locating the chamber or compartment 16 upon the supporting member 10 so that the former may be easily removed and replaced with a minimum of effort. The interior of the compartment or housing 16 is adapted to receive ice or other cooling medium for maintaining the butter B, or the like, within the tube 21 at proper temperature. In place of ice, it will be understood, of course, that the housing or chamber 16 may be provided with a refrigerator mechanism of conventional construction.

The top of the chamber or compartment 16 is closed by a removable lid or cover 22 and the top of the tube 21 is closed by a removable lid or cover 23. In the illustrated embodiment, the lids or covers 22 and 23 are shown as separate members but it will be apparent that these may be formed as one if desired. The cover 23 is preferably provided with a small central opening through which an elongated rod or tube 24 is slidable, the lower end of the latter being provided with a piston or plunger member 25 which is adapted to engage and rest upon the upper end of the uppermost cube or block of butter B in the tube 21. The outer end of the rod 24 may be provided with a knob or the like 26, the position of which, relative to the lid or cover 23, provides a ready indication of the amount of butter or the like remaining in the tube 21. In addition to serving as an indication of the quantity of material remaining to be severed and dispensed, the plunger 25 and rod 24 also serve as a weight to continuously urge the material downwardly through the tube 21 which movement is facilitated by virtue of the tube 21 being circular in cross section while the butter or similar material is rectangular and hence engages the tube only along the edges or corners thereof.

The cutting and dispensing mechanism is provided upon the lower side of the horizontal portion or surface 11 of the supporting member 10 and is preferably carried by a plate or base member 27 which is removably secured to the portion 11 of the supporting member 10 by means of machine screws or the like 28 threaded into tapped lugs or bosses 29 welded or otherwise secured to the portion 11. The base member or plate 27 is provided with a downwardly extending pivot pin or rod 30 upon which a pair of members 31 and 32 are pivotally supported for horizontal swinging or rocking movement. Each of these members comprises a butter cutting or severing blade or portion and a stop member or portion which are integrally interconnected in horizontal and vertical spaced relationship.

The member 31 comprises a transversely extending portion 33 having a laterally extending lug or projection 34 provided with a vertical opening for reception of the pivot pin 30. Adjacent one end of the portion 33 is rigidly connected a horizontally extending portion 35 which is spaced a predetermined distance beneath the bottom of the guide or tube 21 and movable into and out of the path of the butter B, or the like, descending therefrom to provide an abutment or stop for the latter. The other end of the portion 33 has a butter cutting blade or portion 36 secured thereto at an elevation spaced above the stop member 35 a distance corresponding to the thickness of the chip or pat of the butter or the like which is to be severed. As will be apparent from Figs. 3 and 4, the spacing of the members or portions 35 and 36 are such that when the member 31 is in the position shown in Fig. 3, the stop portion or member 35 extends beneath the tube 21, while the blade or member 36 is disposed to one side thereof.

The member 32 is formed similar to the member 31, and likewise comprises a stop portion 37 rigidly connected at one end to a transversely extending bar or member 38, the other end of which is rigidly connected to a blade member or portion 39, with the bar 38 pivoted intermediate its ends upon the pivot pin 30. The stop member 37 and blade 39 are spaced similar to the spacing of the stop member 35 and blade member 36, and the proportions and dimensions of parts are such that the two stop members or portions 35 and 37 are adapted to horizontally align and engage beneath the tube 21 when the blade portions 36 and 39 are spaced on either side thereof. Conversely, the members 31 and 32, when rocked to the other extreme positions thereof, place the blades 36 and 39 in engagement while the stop members 35 and 37 are spaced from each as shown in Fig. 4.

It will be evident, therefore, that a cube or block of butter B or the like in the tube 21 will, when the parts are in a position shown in Fig. 3, slide downwardly until it comes to rest upon the engaged stop members 35 and 37. However, when the members 31 and 32 are rocked to their other extreme positions as indicated in Fig. 4, the blade members 36 and 39 will enter into the opposite sides of the cube or block of butter, severing therefrom a predetermined portion thereof from the said block or cube, thickness of which severed portion is determined by the vertical distance between the stop members and the blades. This severed chip or pat will then drop upon the dish 15. When the blades 36 and 39 are returned to their initial positions, by rocking the members 31 and 32 to the positions shown in Fig. 3, the blades 36, 39 no longer obstruct the cube or block of butter, so that the latter moves downwardly until it comes to rest upon the now engaged stop members 35 and 37 whereupon the operations of the members 31 and 32 may be repeated to again sever a slice of butter of predetermined dimensions.

The movements of the members 31 and 32 are effected in the preferred embodiment by providing an arm or link 40 which is rockably mounted adjacent one end by means of a pivot pin 41 secured to the plate or base 27, the link 40 being retained upon the pivot pin 41 by means of a suitable washer 42 and cotter pin or the like 43. Intermediate its ends, the link or arm 40 is pivotally connected to one end each of a pair of links 44 and 45. The other end of the link 44 is pivotally connected to an extension arm or portion 46 of the stop member 37. The other end of the link 45 is similarly pivoted to an extension portion 47 of the stop member 35. The link or arm 40 is adapted to be moved by a handle member 48, the inner end of which is pivotally connected to the free end of the link or arm 40.

It will be evident from the construction just described that movement of the handle member 48, substantially in the direction of its length, will effect rocking of the arm or link 40 about the pivot 41 and this movement will be transmitted through the links 44 and 45 to effect equalized rocking of the members 31 and 32 about the pivot 30. Consequently, when the handle member 48 is moved inwardly of the support or member 10 and to the position shown in Fig. 4, the stop members or portions will be engaged and the blades will be separated. When the handle member 48 is pulled outwardly of the support member 10, the members 31 and 32 will be rocked to their other extreme positions at which time the stop members or portions will be separated and the blades engaged as indicated in Fig. 3. The handle member 48 is guided and normally constrained to movement substantially in the direction of its length by an elongated slot 49 in which a pin 50, supported upon the base member 27, is received, the handle 48 being prevented from dropping from the pin 50 by virtue of a washer 51 and cotter pin 52 provided upon the pin 50 beneath the handle member 48.

The equalized action of the cutting blades 36 and 39 facilitates proper slicing and detachment of a pat or chip of butter from the block of material. However, a means is provided for positively clearing a severed chip or pat of the material from the blades in the event there should be a tendency for the severed portion to cling to the under sides of the blades. In the preferred embodiment, this detaching or clearing means comprises a bent lever 53 pivoted, as indicated at 54, to the base plate or member 27 at the intersection of the arms 55, 56 of the lever and at a location which is substantially between the handle 48 and the member 27 when the handle is in the full line position shown in Figs. 3 and 4. The longer arm 55 of the lever 53 extends between the stop members and blades of the members 31, 32 and preferably closely adjacent the under surfaces of the blades 36 and 39. The shorter arm 56 of the clearing means or lever 53 extends substantially parallel with the handle member 48 when the latter is in its blade and stop actuating position and this portion of the clearing means or lever 53 is connected with the handle 48 for actuation thereby. In the preferred embodiment here illustrated, this connection is provided by a pivot pin 57 carried by the arm 56 and extending through an elongated slot 58 in the handle 48, this slot being located forwardly of the handle with respect to the slot 49. The arm 56 and handle 48 are retained in proper relation by means of a washer 59 and cotter pin or the like 60.

Movement of the clearing member 53 in the construction just described, is effected by moving or rocking the handle member 48 transversely of its path of movement for actuation of the members 31 and 32. This rocking or transverse movement of the handle member is made possible by virtue of a transversely extending recess or slot 61 communicating with the slot 49 adjacent the forward end of the latter and corresponding to the position of the pin 50 in the slot 49 when the blades 36 and 39 are in engagement, see Fig. 4. Consequently, when the handle member 48 has been moved to the position shown in Fig. 4 for severing a chip or pat of butter or the like, the handle member 48 may then be rocked or moved transversely to its broken line position as shown in Fig. 4, thus moving the arm 55 of the clearing member or means beneath the blades 36 and 39, thereby detaching the severed chip or pat from the blades. When the handle 48 is again rocked to its full line position, the handle 48 will be disposed so that the pin 50 can again cooperate with the longitudinal slot 49 whereupon the handle member may be reciprocated for effecting gauging and cutting of a new chip or pat of the material.

It will be evident, therefore, that in operating the device, the handle 48 is normally reciprocated in substantially a straight line for repeatedly gauging and severing chips or pats of butter and the handle 48 is only rocked transversely to detach a severed chip or pat which might cling to the blades 36 and 39. Moreover, it will be noted that this clearing or detaching action can occur only when the blades 36 and 39 are in substantial engagement so that there can be no tearing or breaking of the chip or pat from the main body of the block of material as would be the case if the clearing means were operated before the blades had completed their severing operation.

It is believed that the mode of utilization of the apparatus will now be clearly apparent from the aforegoing detailed description of its construction. However, the operation may, for convenience, be summarized as follows: The elongated cubes or blocks of butter material which are to be cut into slices or pats of uniform dimensions are inserted in the guide or tube 21 by removing the cover 23 and plunger 25 after which these members are replaced so that the plunger comes to rest upon the upper end of the uppermost cube or block of material, it being understood that the dimensions of the apparatus may be such that one or more cubes or blocks of butter or the like can be simultaneously received in the guide or tube member 21. The butter material within the guide or tube member is maintained at a proper temperature by means of ice or other refrigerating material placed within the container or compartment 16 by removal of the cover 22 after which the cover 22 is again replaced to the position shown in Fig. 2.

The elongated cubes or blocks of butter will gravitate downwardly in the guide member or tube 21 until they come to rest upon either the blade members 36, 39 or the stop portions 35, 37 whichever may initially be positioned beneath the tube 21. Let it be assumed that the handle 48 is initially in the position shown in Fig. 4 so that the blade members or portions 36 and 39 are in engagement. Consequently, the lower end of the material B will rest upon the upper surfaces of the blade members 36, 39. If it now be desired to dispense a chip or pat of the material, the handle 48 is pulled outwardly, that is to the left as viewed in Figs. 2 to 4, in substantially a straight line. This will rock the members 31 and 32 to the positions shown in Fig. 3 from which it will be seen that the blade members or portions 36, 39 are now disposed on opposite sides of the block of material moving from the tube or guide 21, while the stop members 35, 37 have moved into engagement beneath the said block or cube of material. Therefore, the said material will drop downwardly from its initial position until it comes to rest upon the upper surface of the members 35 and 37. The operator then pushes inwardly on the handle 48 moving the latter from the position shown in Fig. 3 to the position as shown in Fig. 4. This causes the blade members 36 and 39 to engage the opposite sides of the block or cube of material and move inwardly thereof, with equalized force until they have substantially met, thereby severing the chip or pat from the main block of the material. Simultaneously, the stop members 35 and 37 will have been retracted from beneath the tube or guide member 21 so that the severed chip or pat can freely drop and be received in a butter dish or the like placed thereneath.

In the event a severed chip or pat fails to drop, it may be positively detached from the lower surface of the blades 36 and 39 by rocking the handle member 48 transversely, thereby moving the arm 55 of the clearing means 53 beneath the blades 36, 39 as is indicated in the broken lines in Fig. 4. Upon return of the handle member 48 to the full line position shown in Fig. 4, additional chips or pats of the material can be severed and dispensed by repeating the aforementioned sequence of operations, it being understood however, that rocking of the handle member 48 to detach a severed chip or pat is not generally necessary so that successive chips or pats can frequently be cut and dispensed by simply reciprocating the handle 48.

As the handle 48 is repeatedly actuated as aforementioned, the elongated blocks or cubes of butter will descend within the guide member 21, the extent of this movement at each complete actuation of the handle being the distance between the blades 36, 39 and the stop members 35, 37. The amount of material remaining in the guide member or tube 21 is continuously indicated by the position of the knob 26 at the upper end of the rod 24. When the position of this knob indicates that the supply of the butter material within the guide member 21 has dropped sufficiently to permit insertion of a new cube or block, this may be readily effected by simply removing the plunger 25 and cover 23 through grasping the handle or knob 26 and lifting upwardly thereof. The downward movement of the material within the tube 21 ordinarily occurs without the need of attention but if for some reason, the blocks or cubes should adhere within the guide or tube member 21 and not move downwardly freely, the plunger 25 may be positively pushed downwardly by a thrust on the rod 24.

When it is desired to remove melted ice or the like from the compartment 16, the latter may be bodily lifted from the support 10 without removal of fastening means or the like, and the compartment may be again readily replaced in proper position by virtue of the depending flange of the outer wall 17 and the downwardly extending portion of the tube or guide 21. This ready removal of the compartment 16 enables the support 10 to be easily removed from the counter or table 13 for cleaning or the like and the cleaning operations may be further facilitated, if desired, by removing the base plate or member 27 from the housing 10 by removing the screws 28. The operating mechanism will, however, remain intact upon the plate or base 27 so that it may be readily reassembled with the support 10 without the need of special tools or training.

Although the presently preferred apparatus has been described and illustrated in considerable detail, it will be understood that numerous variations may be made by use of equivalents, as will be understood by those skilled in 2,727,306

Having thus described the invention, we claim:

1. In an apparatus for slicing a block of material, a housing having guide means for supporting the material to be cut for movement along a predetermined path, a pair of stop members movable from positions clear of said path on opposite sides thereof to positions across said path, a pair of blade members on said opposite sides of said path and movable from positions clear of said path to positions in engagement with each other across said path, means operatively connecting each of said blade members to the stop member on the opposite side of said path respectively to move the stop members clear of said path as said blade members move into engagement with each other and to return said stop members to their positions across said path as said blade members are returned to their positions clear of said path, and operating means operatively connected to said blade members for simultaneously moving the latter between said positions.

2. In an apparatus for slicing a block of material, a housing having guide means for supporting the material to be cut for movement along a predetermined path, a pair of stop members movable from positions clear of said path on opposite sides thereof to positions across said path, a pair of cooperating blade members on said opposite sides of said path and movable from positions clear of said path to positions in engagement with each other across said path, means operatively connecting each of said blade members to the stop member on the opposite side of said path respectively to move the stop member clear of said path as said blade members move into engagement with each other and to return said stop members to their positions across said path as said blade members are returned to their positions clear of said path, and means operatively connected to said blade members for simultaneously moving the latter between said positions, a single reciprocable operating handle, and operating means operatively connecting said handle to said blade members for simultaneously actuating the latter between said positions upon reciprocation of said handle.

3. In an apparatus for slicing a block of material, a housing having channel means for supporting the material to be cut for movement along a predetermined path, said channel means having an inlet end and a discharge end, a pair of stop members disposed outwardly of said discharge end and movable from positions clear of said path on opposite sides thereof to positions across said path, a pair of cooperating blade members on said opposite sides of said path disposed inwardly of said stop members with respect to said channel means and movable from positions clear of said path to positions in engagement with each other across said path, means operatively connecting each of said blade members to the stop member on the opposite side of said path respectively to move the stop members clear of said path as said blade members move into engagement with each other and to return said stop members to their positions across said path as said blade members are returned to their positions clear of said path, and operating means operatively connected to said blade members and said stop members for simultaneously actuating the blade members and stop members between their respective positions.

4. In an apparatus for slicing a block of material, a housing having guide means for supporting the material to be cut for movement along a predetermined path, a pair of stop members movable from positions clear of said path on opposite sides thereof to positions across said path, a pair of cooperating blade members on said opposite sides of said path and movable from positions clear of said path to positions in engagement with each other across said path, means operatively connecting each of said blade members to the stop member on the opposite side of said path respectively to move the stop members clear of said path as said blade members move into engagement with each other and to return said stop members to their positions across said path as said blade members are returned to their positions clear of said path, the last-said means comprising a first rigid member carrying one of said stop members and the respective blade member on the opposite side of said path and a second rigid member carrying the other of said stop members and the other blade member, said blade members being disposed inwardly of said stop members with respect to the direction of movement of the material along said predetermined path, and operating means operatively connected to said first and second rigid members for simultaneously moving the blade members and the stop members between their respective positions.

5. In an apparatus for slicing a block of material, a housing having guide means for supporting the material to be cut for movement along a predetermined path, a pair of stop members movable from positions clear of said path on opposite sides thereof to positions across said path, a pair of cooperating blade members on said opposite sides of said path and movable from positions clear of said path to positions in engagement with each other across said path, means operatively connecting each of said blade members to the stop member on the opposite side of said path respectively to move the stop member clear of said path as said blade members move into engagement with each other and to return said stop members to their positions across said path as said blade members are returned to their positions clear of said path, the last-said means comprising a first rigid member carrying one of said stop members and the respective opposite blade member and a second rigid member carrying the other of said stop members and the respective opposite blade member, said blade members being disposed inwardly of said stop member with respect to the direction of movement of the material along said predetermined path, and a single reciprocable operating handle operatively connected to said first and second members for simultaneously actuating the blade members and the stop member between their respective positions upon reciprocation of the handle.

6. In an apparatus for slicing a block of material, a housing having guide means for supporting the material to be cut for movement along a predetermined path, a pair of stop members movable from positions clear of said path on opposite sides thereof to positions across said path, a pair of cooperating blade members on said opposite sides of said path and movable from positions clear of said path to positions in engagement with each other across said path, means operatively connecting each of said blade members to the stop member on the opposite side of said path respectively to move the stop member clear of said path as said blade members move into engagement with each other and to return said stop members to their positions across said path as said blade members are returned to their positions clear of said path, the last-said means comprising a first rigid member carrying one of said stop members and the respective opposite blade member and a second rigid member carrying the other of said stop members and the respective opposite blade member, said blade members being disposed inwardly of said stop member with respect to the direction of movement of the material along said predetermined path, means pivotally supporting said first and second rigid members and engaging each of the latter intermediate the stop member and the blade member supported by the respective rigid member and means operatively connected to said first and second rigid members for simultaneously moving the blade members and the stop members between their respective positions.

7. In an apparatus for slicing a block of material, a housing having channel means for supporting the material to be cut for movement along a predetermined path, said channel means having an exit end for the material, stop means disposed outwardly of said exit end, means supporting said stop means for movement between a position clear of said path and second position across said path, blade means adjacent to said path and disposed inwardly of said stop means with respect to said path, means supporting said blade means for a severing movement across said path from a position clear of said path, a wiper member disposed adjacent to said path intermediate said stop means and said blade means, means supporting said wiper member for wiping movement across said path from a position clear of said path and for a return movement, operating means operatively connected to said blade means and said stop means and actuatable to simultaneously move said blade means through said severing movement and said stop means clear of said path and to simultaneously return said blade means to their position clear of said path and to move said stop means across said path, and means operatively connecting said wiper member to the last-said means for actuation thereby when said stop means is clear of said path.

8. In an apparatus for slicing a block of material, a housing having channel means for supporting the material to be cut for movement along a predetermined path, said channel means having an inlet end and a discharge end, a pair of stop members disposed outwardly of said discharge end and movable from positions clear of said path on opposite sides thereof to positions across said path, a pair of cooperating blade members on said opposite sides of said path disposed inwardly of said stop members with respect to said channel means and movable from positions clear of said path to positions in engagement with each other across said path, means operatively connecting each of said blade members to the stop member on the opposite side of said path respectively to move the stop members clear of said path as said blade members move into engagement with each other and to return said stop members to their positions across said path as said blade members are returned to their positions clear of said path, operating means operatively connected to said blade members and said stop members for simultaneously actuating the blade members and stop members between their respective positions, a wiper member disposed adjacent said path intermediate said stop members and said blade members, means movably supporting said wiper member for movement across said path from a position clear of said path, and means operatively connecting said wiper member to said operating means for actuation thereby when said stop members are clear of said path.

9. In an apparatus for slicing a block of material, a housing having guide means for supporting the material to be cut for movement along a predetermined path, a pair of stop members movable from positions clear of said path on opposite sides thereof to positions across said path, a pair of blade members on said opposite sides of said path and movable from positions clear of said path to positions in engagement with each other across said path, means operatively connecting each of said blade members to the stop member on the opposite side of said path respectively to move the stop member clear of said path as said blade members move into engagement with each other and to return said stop members to their positions across said path as said blade members are returned to their positions clear of said path, and means operatively connected to said blade members for simultaneously moving the latter between said positions, a single operating handle, means supporting said handle for reciprocation between first and second positions and for rocking movement about a pivot when in one of its said positions, means operatively connecting said handle to said rigid members to move said blade members and said stop members to one of their said positions upon movement of the handle to one of its said positions and to move said blade members and said stop members to the other of their said positions upon movement of said handle to the other of its positions, a wiper member disposed adjacent said path intermediate said stop members and said blade members, means movably supporting said wiper member for movement across said path from a position clear of said path, and means operatively connecting said wiper member to said handle for actuation thereby upon rocking movement about its pivot.

10. In an apparatus for slicing a block of material, a housing having guide means for supporting the material to be cut for movement along a predetermined path, a pair of stop members movable from positions clear of said path on opposite sides thereof to positions across said path, a pair of cooperating blade members on said opposite sides of said path and movable from positions clear of said path to positions in engagement with each other across said path, means operatively connecting each of said blade members to the stop member on the opposite side of said path respectively to move the stop members clear of said path as said blade members move into engagement with each other and to return said stop members to their positions across said path as said blade members are returned to their positions clear of said path, the last-said means comprising a first rigid member carrying one of said stop members and the respective blade member on the opposite side of said path and a second rigid member carrying the other of said stop members and the other blade member, said blade members being disposed inwardly of said stop members with respect to the direction of movement of the material along said predetermined path, operating means operatively connected to said first and second rigid members for simultaneously moving the blade members and the stop members between their respective positions, a wiper member disposed adjacent said path intermediate said stop members and said blade members, means movably supporting said wiper member for movement across said path from a position clear of said path, and means operatively connecting said wiper member to said operating means for actuation thereby when said stop members are clear of said path.

11. In an apparatus for slicing a block of material, a housing having guide means for supporting the material to be cut for movement along a predetermined path, a pair of stop members movable from positions clear of said path on opposite sides thereof to positions across said path, a pair of blade members on said opposite sides of said path from said stop members and movable from positions clear of said path to positions in engagement with each other across said path, means operatively connecting each of said blade members to the stop member on the opposite side of said path respectively to move the stop member clear of said path as said blade members move into engagement with each other and to return said stop members to their positions across said path as said blade members are returned to their positions clear of said path, the last-said means comprising a first rigid member carrying one of said stop members and the respective opposite blade member and a second rigid member carrying the other of said stop members and the respective opposite blade member, said blade members being disposed inwardly of said stop member with respect to the direction of movement of the material along said predetermined path, means pivotally supporting said first and second rigid members and engaging the latter intermediate the stop member and the blade member supported by the respective rigid member, a single operating handle, means supporting said handle for reciprocation between first and second positions and for rocking movement about a pivot when in one of its said positions, means operatively connecting said handle to said rigid members to move said blade members and said stop members to one of their said positions upon movement of the handle to one of its said positions and to move said blade members and said stop members to the other of their said positions upon movement of said handle to the other of its positions, a wiper member disposed adjacent said path intermediate said stop members and said blade members, means movably supporting said wiper member for movement across said path from a position clear of said path, and means operatively connecting said wiper member to said handle for actuation thereby upon rocking movement about its pivot.

References Cited in the file of this patent

UNITED STATES PATENTS

| | | |
|---|---|---|
| 1,273,227 | Hren | July 23, 1918 |
| 1,898,705 | Wood et al. | Feb. 21, 1933 |
| 2,174,772 | Berg | Oct. 3, 1939 |
| 2,500,973 | Ackerman | Mar. 21, 1950 |